(12) United States Patent
Farrugia et al.

(10) Patent No.: US 9,374,616 B2
(45) Date of Patent: Jun. 21, 2016

(54) METHOD AND APPARATUS FOR ON DEMAND VIDEO AND OTHER CONTENT RENTAL

(71) Applicant: Apple Inc., Cupertino, CA (US)

(72) Inventors: Augustin J. Farrugia, Cupertino, CA (US); Jeffrey Robbin, Los Altos, CA (US); Hiro Mitsuji, San Francisco, CA (US); Mihailo Despotovic, Santa Clara, CA (US); Colin Meldrum, Berkeley, CA (US)

(73) Assignee: APPLE INC., Cupertino, CA (US)

( * ) Notice: Subject to any disclaimer, the term of this patent is extended or adjusted under 35 U.S.C. 154(b) by 37 days.

(21) Appl. No.: 14/224,010

(22) Filed: Mar. 24, 2014

(65) Prior Publication Data

US 2014/0298376 A1    Oct. 2, 2014

Related U.S. Application Data

(63) Continuation of application No. 12/169,508, filed on Jul. 8, 2008, now Pat. No. 8,706,638.

(60) Provisional application No. 61/010,763, filed on Jan. 11, 2008.

(51) Int. Cl.
*H04N 7/167*  (2011.01)
*H04N 21/4408*  (2011.01)
*H04N 7/16*  (2011.01)
(Continued)

(52) U.S. Cl.
CPC ........... *H04N 21/4408* (2013.01); *H04N 7/165* (2013.01); *H04N 7/17318* (2013.01); *H04N 21/2541* (2013.01); *H04N 21/26613* (2013.01); *H04N 21/437* (2013.01); *H04N 21/4405* (2013.01); *H04N 21/47202* (2013.01); *H04N 21/6125* (2013.01); *H04N 21/6175* (2013.01);
(Continued)

(58) Field of Classification Search
CPC .............. H04N 7/165; H04N 7/17318; H04N 21/4408; H04N 21/2541; H04N 21/26613; H04N 21/437; H04N 21/4405; H04N 21/47202; H04N 21/6125; H04N 21/6175; G06F 21/10; G06F 21/62; G06F 21/6209
See application file for complete search history.

(56) References Cited

U.S. PATENT DOCUMENTS 5,485,577 A    1/1996    Eyer et al.
5,629,980 A    5/1997    Stefik et al.
(Continued)

FOREIGN PATENT DOCUMENTS

WO    WO 2009/088490    7/2009

OTHER PUBLICATIONS

International Search Report and Written Opinion for PCT/US2008/014150, Sep. 3, 2009 (date of mailing), Apple Inc.
(Continued)

*Primary Examiner* — Calvin Cheung
(74) *Attorney, Agent, or Firm* — Adeli LLP

(57) ABSTRACT

A video on demand system in the context of the Internet, for video rentals. A user accesses an on-line store to rent a video program or movie. The rental is for a limited time (such as 30 days) and within that thirty days, the video program or movie can only be viewed for a 24 hour time window. The time limits are enforced by the on-line store which maintains a database of each rental transaction and allows supply of the needed keys for decrypting the (encrypted) video or movie only if within the time limits.

20 Claims, 2 Drawing Sheets

(51) Int. Cl.

| | | |
|---|---|---|
| *H04N 7/173* | (2011.01) | |
| *H04N 21/254* | (2011.01) | |
| *H04N 21/266* | (2011.01) | |
| *H04N 21/472* | (2011.01) | |
| *H04N 21/61* | (2011.01) | |
| *H04N 21/437* | (2011.01) | |
| *H04N 21/4405* | (2011.01) | |
| *G06F 21/00* | (2013.01) | |
| *G06F 21/10* | (2013.01) | |
| *G06F 21/62* | (2013.01) | |

(52) U.S. Cl.
CPC .............. *G06F 21/10* (2013.01); *G06F 21/62* (2013.01); *G06F 21/6209* (2013.01)

(56) References Cited

U.S. PATENT DOCUMENTS

| | | | | |
|---|---|---|---|---|
| 5,933,498 | A | 8/1999 | Schneck et al. | |
| 6,728,379 | B1 * | 4/2004 | Ishibashi | H04L 63/0428 348/E7.056 |
| 6,754,642 | B2 | 6/2004 | Tadayon et al. | |
| 6,813,636 | B1 * | 11/2004 | Bean | H04M 3/5237 379/265.12 |
| 7,020,636 | B2 * | 3/2006 | Ohmori | G06F 21/10 705/307 |
| 7,631,323 | B1 | 12/2009 | Green et al. | |
| 7,849,016 | B2 * | 12/2010 | So | G06Q 20/401 705/51 |
| 8,166,508 | B2 * | 4/2012 | Mitsuji | G06Q 30/06 386/349 |
| 8,706,638 | B2 | 4/2014 | Farrugia et al. | |
| 8,731,381 | B2 * | 5/2014 | Hamersley | G11B 20/00086 348/231.99 |
| 2001/0036271 | A1 | 11/2001 | Javed | |
| 2002/0013940 | A1 * | 1/2002 | Tsukamoto | H04N 7/163 725/5 |
| 2002/0049679 | A1 | 4/2002 | Russell et al. | |
| 2002/0049717 | A1 * | 4/2002 | Routtenberg | H04H 60/21 |
| 2002/0073033 | A1 | 6/2002 | Sherr et al. | |
| 2002/0099948 | A1 * | 7/2002 | Kocher | G06F 21/10 713/194 |
| 2002/0104019 | A1 * | 8/2002 | Chatani | G06F 21/10 726/27 |
| 2002/0138439 | A1 * | 9/2002 | Matsushima | G06Q 30/06 705/52 |
| 2002/0154157 | A1 | 10/2002 | Sherr et al. | |
| 2002/0183985 | A1 * | 12/2002 | Hori | G06F 21/10 703/1 |
| 2002/0184515 | A1 | 12/2002 | Oho et al. | |
| 2003/0069854 | A1 | 4/2003 | Hsu et al. | |
| 2003/0135467 | A1 * | 7/2003 | Okamoto | G06F 21/10 705/52 |
| 2003/0163684 | A1 | 8/2003 | Fransdonk | |
| 2003/0182142 | A1 | 9/2003 | Valenzuela et al. | |
| 2003/0229898 | A1 | 12/2003 | Babu et al. | |
| 2004/0249768 | A1 | 12/2004 | Kontio et al. | |
| 2005/0108176 | A1 | 5/2005 | Jarol et al. | |
| 2005/0114896 | A1 | 5/2005 | Hug et al. | |
| 2005/0240961 | A1 | 10/2005 | Jerding et al. | |
| 2005/0276570 | A1 | 12/2005 | Reed, Jr. et al. | |
| 2006/0059104 | A1 * | 3/2006 | Ebihara | G06F 21/10 705/59 |
| 2006/0116890 | A1 * | 6/2006 | Nakamura | G06F 21/629 705/51 |
| 2006/0123484 | A1 | 6/2006 | Babic et al. | |
| 2007/0027812 | A1 * | 2/2007 | Ogawa | G06F 21/10 705/57 |
| 2007/0033416 | A1 * | 2/2007 | Nonaka | H06L 9/0822 713/189 |
| 2007/0079342 | A1 * | 4/2007 | Ellis | H04N 5/913 725/89 |
| 2007/0098162 | A1 | 5/2007 | Shin | |
| 2007/0130585 | A1 | 6/2007 | Perret et al. | |
| 2007/0203846 | A1 | 8/2007 | Kavuri et al. | |
| 2007/0239611 | A1 * | 10/2007 | Blum | G06F 17/30749 705/51 |
| 2008/0005025 | A1 | 1/2008 | Legere et al. | |
| 2008/0168515 | A1 * | 7/2008 | Benson | G06F 21/10 725/110 |
| 2008/0229374 | A1 | 9/2008 | Mick et al. | |
| 2008/0263610 | A1 | 10/2008 | Murray et al. | |
| 2009/0157553 | A1 * | 6/2009 | Wang | G06Q 30/0601 705/59 |
| 2009/0193479 | A1 * | 7/2009 | Briller | G11B 20/00086 725/109 |

OTHER PUBLICATIONS

International Preliminary Report on Patentability for PCT/US2008/014150, Jul. 13, 2010 (date of issuance), Apple Inc.

Author unknown, Terms under the letter "T" from The Authoritative Dictionary of IEEE Standards Terms, 7th Ed., IEEE, Inc., New York, NY, Dec. 2000.

* cited by examiner

METHOD AND APPARATUS FOR ON DEMAND VIDEO AND OTHER CONTENT RENTAL

CLAIM OF BENEFIT TO PRIOR APPLICATIONS

This application is a continuation application of U.S. patent application Ser. No. 12/169,508, filed Jul. 8, 2008, now issued as U.S. Pat. No. 8,706,638. U.S. patent application Ser. No. 12/169,508 claims priority to U.S. Provisional Application 61/010,763, filed Jan. 11, 2008. U.S. patent application Ser. No. 12/169,508, now issued as U.S. Pat. No. 8,706,638 and U.S. Provisional Application 61/010,763 are incorporated herein by reference in their entirety.

FIELD OF THE INVENTION

This invention generally relates to video on demand and more specifically to controlling use of video on demand content.

BACKGROUND

Video on demand is a well-known technology. It generally allows users to select and watch digital video content over a network, such as cable TV, as part of an interactive television system. VOD systems either stream content allowing viewing in real time or download it in which the program is brought in its entirety to a set top box in the cable television context before viewing starts. Most current video on demand systems are in the context of cable and telephone company or satellite television distribution systems. In most of these systems the user buys or selects a movie or television program and it begins to play in the television set almost immediately. Typically a payment must be made for each viewing.

Typically in the video on demand context, the commerce-related part of the transaction is similar to renting a video since viewing is strictly limited in terms of time and/or number of viewings. In some video on demand systems for instance one may watch the video as many times as one wants, but only beginning for a period of 24 hours beginning when the rental is made. Such video on demand systems are very limited in terms of user control and access and they typically require viewing to begin immediately upon purchase. This is due to the inherent limitations of the delivery system and the user's device which is typically a cable television set top box or equivalent.

SUMMARY

In accordance with this disclosure, a video on demand system is provided, not in the context of cable television, but instead in the computer network (Internet) context. It is known of course to purchase (or obtain without payment) video and audio material from a website via the Internet, which is then downloaded partially or in its entirety to the user's device typically a personal computer, or consumer electronics device such as an iPod or Apple TV device or other such device. If these are purchases the viewer then owns the content and can view it as many times as he wants indefinitely. However in the context of the system disclosed here, instead a video on demand approach is used in which the user rents use of the audio or video material for a limited time for a fixed payment and then can view the rented content at the time and place of his choosing using his consumer electronics device, such as an Apple TV or iPod device. Some such devices may require connection to the Internet via a host computer.

Hence in one embodiment, the present system supports movie rental from, for instance, the Apple iTunes Store which is a central website, providing content. Users are able to rent movies or other video material and view it on their Apple TV or iPod device. In some embodiments, the material may be transferred from one client (user) device to another. Typically upon purchase of the audio or video asset (program or movie and also referred to as content), a 30-day or other defined time period begins. The material may be viewed and/or listened to any time during that 30-day time. In addition, any time during that 30-day time when the viewer actually plays the material, a 24-hour window begins during which unlimited viewing is permitted. However once that 24-hour window has ended no more viewing is permitted. Of course these time limits are merely illustrative. In one embodiment, the present system supports both high definition television and standard definition television. In one embodiment, each individual program has its own assigned rental period both in terms of the overall time of rental such as the 30-day time span and also the 24-hour window.

DETAILED DESCRIPTION

Figure 1:
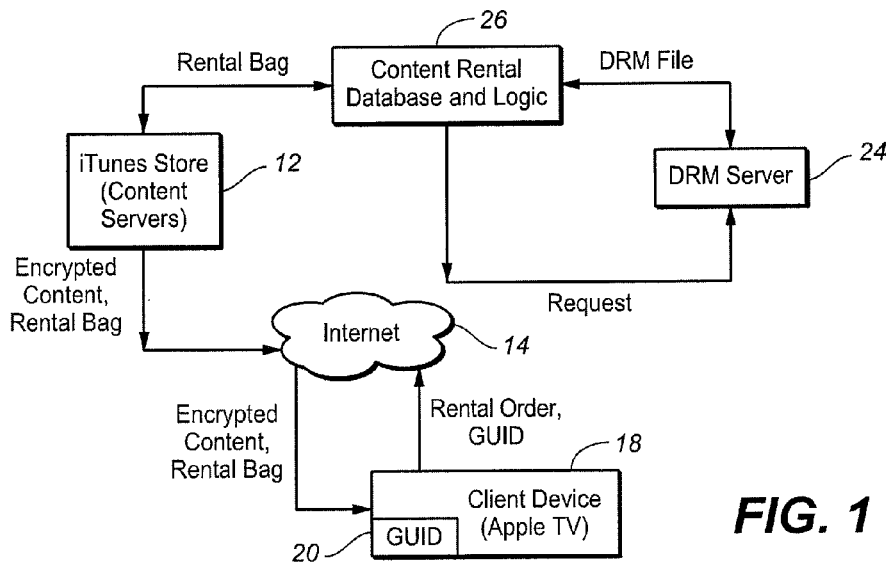
FIG. 1 shows the environment in which the present system operates.

FIG. 1 shows the environment in which the present system operates. Most elements here are conventional and hence not explained in further detail. At the head end, there is a digital video on demand delivery service such as the iTunes Store 12 in one embodiment, more broadly a set of content and commerce servers operated by a commercial entity for storing (or accessing) a number of programs and/or movies and/or audio items such as music. This element 12 of the system is conventional since for instance such stores or more broadly content storage facilities already exist. The iTunes Stores 12 is conventionally coupled to the Internet 14. Also connected to the Internet 14 at the user end is a client device 18 indicated here as an Apple TV device, but which might be an Apple iPod device (with its host computer) or similar consumer electronic devices or computers available from other manufacturers and which are currently available. Each such device 18 has as shown here a global universal identifier GUID 20 which identifies that particular device.

Also provided here at the head end is a conventional DRM (digital rights management) server 24. Such servers already exist in the content of present video and audio downloads and viewing services. Digital rights management refers to the policy enforcement for protecting the content from unauthorized use. Typically this involves some form of encryption. The content is transferred from the iTunes Store 12 or other source to the client device 18 in encrypted form and must be decrypted at the client device 18. Some such encryption schemes are sophisticated. For instance typically the encryption applied to each particular content transfer is different. Also the decryption keys supplied may be useful only for a small portion of each piece of content. In this case what is referred to as a key bag or a file is provided as part of the DRM file holding a number of keys for decrypting the content. The encryption may be symmetric or asymmetric (public key-private key) as known in the field. Typically the security information is provided in the form of a set of DRM data transferred along with or associated with the downloaded encrypted content and is necessary for decrypting and viewing same. The DRM data includes conventionally data defining a security policy associated with that content item, restricting a number of available plays and device transfers. The commerce aspect of ordering the content by the client device 18 is shown by the "rental order" from the client device and is received via the Internet 14 at the iTunes Store 12 which charges the user of the client device 18 the appropriate rental to a credit card or other account. In response, the iTunes Store 12 provides the "encrypted content" or asset along with at the same time or a later time the relevant DRM data which is transferred to the client device 18. Generally, the encrypted content is downloaded from the iTunes Store 12 to the client device 18 first, without the DRM data (including the key bag) needed to play the content. The DRM data is transmitted later, usually in response to the play request by the user, including the key bag as explained further below.

Also shown here is what is referred to as a content rental database and logic 26. This element here is not present in conventional audio/video content purchase systems. Its operation is explained further below, but essentially it controls delivery of the relevant DRM data as so as to enforce the rental time limits. It may be resident on its own server or part of the iTunes Store server(s) 12.

Figure 2:
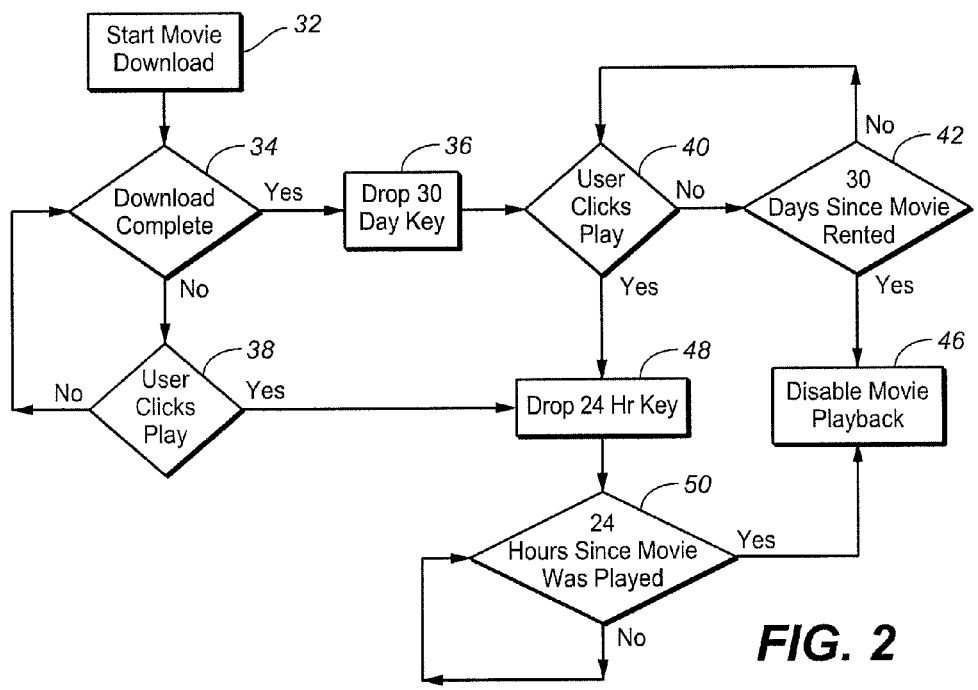
FIG. 2 shows a flowchart showing the process of renting a movie in this example.

FIG. 2 shows in a flowchart the overall digital rights management for a rental in accordance with this disclosure using the FIG. 1 system. Not shown here is the initial order by the user or the content encryption which is conventional, since FIG. 2 shows the sequence of events at a high level. The initial action 32 here is that the movie (content) download is initiated to the user device 18 (after of course the ordering procedure has been completed and the content encrypted.). In the next step 34 it is determined if at the present time the download has been completed. This is a query made for instance every 5 seconds. If before the download is completed ("No") the user has clicked "play" on his user device 18, that is he wants to start playing, the download is continued during playing. Thus this functions as a conventional video on demand system where the user watches the video as it is being downloaded. However there is no requirement to do so. That is one may alternatively download the content and watch it later. In this case if after the download is completed, the user has not yet clicked play, at 36 a 30-day key or token (counter) is provided at the content rental database of FIG. 1. That is, this token expires in for instance 30 days. This time period is only an example here. This is the duration of the rental time in this particular example.

The next step 40 is that at some time after the download begins and after beginning of the 30-day period, the user does decide to play the content. This condition is checked periodically such as every 1 second. If at any particular time the user has not selected play, it is determined in the next step 42 if the 30 day token has expired. If "No", control returns to the "user clicks play" step 40. If "Yes" at 42, the movie playback is disabled at the next step 46 because the 30-day rental time has expired. If the user however clicks play at 38 then the 24-hour window key or token is initiated at 48 at the content rental database. This begins the 24-hour viewing window. This is checked whether the user clicks play during the download or after the download. Then it is checked periodically at 50 such as every 5 seconds if the 24-hours since the play was initiated has expired. If "No", play is resumed. If "Yes", the movie playback is disabled at the next step 46.

Thus in this particular example, the user has 30 days to view the movie after the download begins. In one embodiment this time is a variable designated the rental duration. The user also has 24 hours in this example to view the movie after initiating the first play. (The 24 hours here is only exemplary.) This variable is designated playback duration. Both of these variables may be unique to each asset as determined by the system operator and entered into the content rental database 26 for each content item. Generally after the 30-day or 24-hour periods have expired, the item becomes unplayable due to expiration of its token. However if the time limit is hit while the movie is still playing, the play will not be interrupted. Generally the play will be allowed to finish, that is one can finish watching the movie as long as the movie is not stopped or paused by the user for the remainder of the movie. There is also provided generally both in the user device 18 and in terms of the tokens a pause function. That is one may pause viewing and this also stops the tolling of the 24-hour time limit. The pause time limit is for example 12 hours or for instance a number of times of the actual movie duration.

Figure 3A:
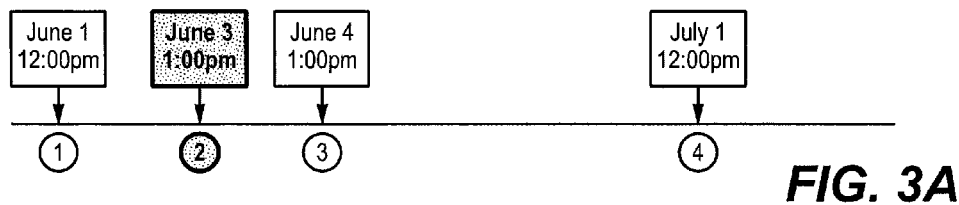
FIGS. 3A-3E shows various timelines for renting and viewing a movie under different circumstances.

Various time lines or scenarios for various circumstances of operation of the FIG. 2 method are shown in FIGS. 3A-3E which are largely self-explanatory. In this case the horizontal line represents the passage of time. Exemplary dates and times of day are shown for purposes of illustration. With reference to FIG. 3A, the first action at point 1 is that the user makes rental and the 30-day rental time begins. At point 2 (shaded), the customer actually starts to view (play) the movie and the 24-hour viewing window begins. There is unlimited playback allowed during this 24-hour window, that is one may watch the movie or other item as much as one wants and as many times as one wants within the 24 hour window. The 24 hours expires at point 3, in this case 24 hours after the initialization of play. The 30 days expires as shown at point 4. Of course in the typical situation the 30 day limit will not be relevant unless the 24 hours begins in the last day of the 30-day window.

Figure 3B:
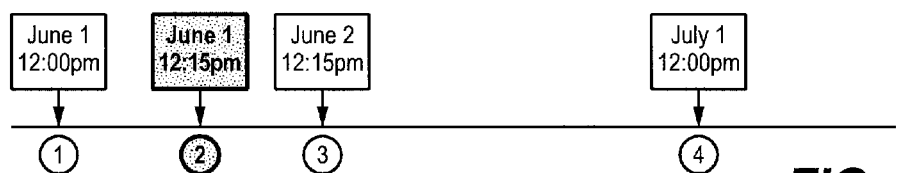

FIG. 3B shows a similar situation as FIG. 3A except that in this case the customer starts viewing the movie at 2 during the download (which may take for instance 30 minutes). Obviously in this case the 30-day rental window at 4 is irrelevant. Note that typically downloading movies takes a considerable amount of time due to the large amount of digital information involved. In this case, the movie viewing window expires at 3 24 hours after the beginning of the viewing time.

Figure 3C:
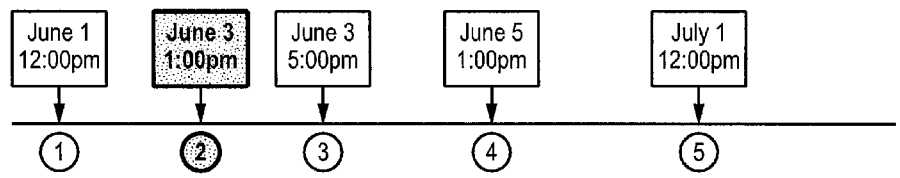

FIG. 3C shows the more complex situation where there is a pause involved as an example of an implementation of the present method. Typically pauses are initiated by the viewer when he wants to stop viewing and do something else and return to viewing later. As shown at point 1, the download is initiated and the 30-day window begins. At point 2, the user begins to view the movie and his 24-hour window begins. Again he has unlimited playback during this 24-hour window. At point 3, part way through the movie, the customer pauses the movie. In this case, he pauses it for two days until point 4 where he pushes the play button on his consumer electronics playback device and resumes viewing. In this case, even though his 24-hour window has expired, the pausing enables him to view the rest of the movie as long as he does not pause or stop the movie again. The viewing period will then expire immediately after completion of the movie. Again in this case point five which is the 30-day rental window is irrelevant.

Figure 3D:
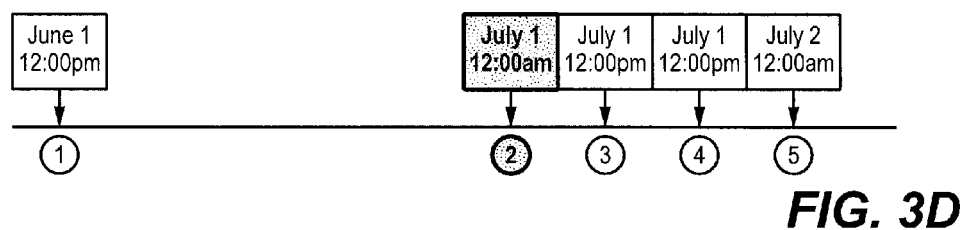
Figure 3E:
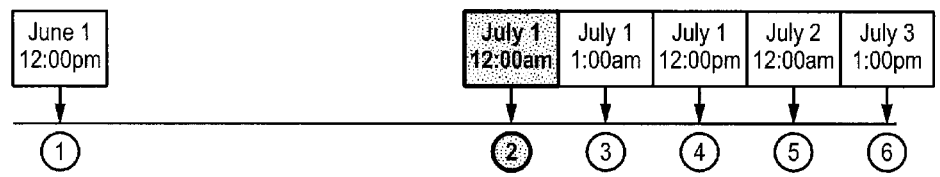

FIGS. 3D and 3E illustrate the situation where the viewing only begins in the last 24 hours of the 30-day window. In FIG. 3D at point 1, the customer initiates the download and the 30-day rental window begins. The customer however only starts to view the movie at point 2, 29 days into the 30-day rental window. The 24-hour viewing window starts immediately. At point 3, the customer stops the movie. Normally the viewing period would have ended at point 4, which is the expiration of the 30-day window. At this point at 5, the customer attempts to resume watching the movie, but since the 30-day window expired he cannot watch it anymore. In another embodiment rather than the 30-day token dominating the 24-hour token, the 24-hour token may be allowed to dominate in which case viewing may be continued as along as it is completed within 24 hours of point 4. This would result in viewing terminating at point 5 in any situation.

FIG. 3E shows a variation on FIG. 3D where at point 1 the customer initiates the download and the 30-day rental period starts. At point 2, the customer starts to view the movie in the 29th day of the 30-day rental period. The 24-hour viewing window starts immediately. At point 3, the customer pauses the movie and leaves his playback device on pause. Normally at point 4 the 30-day rental period would initially have ended. At point 5, the 24-hour window would have ended. However at point 6, the customer resumes play by pushing the play button on his device. In this case, the 24-hour window has expired but the user may view the remainder of the movie as long as the movie is not paused or stopped again. The movie-watching period expires immediately after play is completed.

Note in certain embodiments, the content item may be transferred by the user from one consumer electronics device to another as explained further below. However the 30-day time period and 24-hour window still obtain.

The following is directed to the DRM aspects and what is referred to here as "check-in" and "check-out" procedures in accordance with this disclosure. This is explained in the context of the FIG. 1 system. It is understood that this is carried out in the context of a set of computer programs typically part of the content rental database and logic with co-operating aspects in the DRM server and iTunes Store. These programs are readily coded in light of this disclosure. Typically they would be coded in for instance the C++ language, but this is merely illustrative. Of course the actual code being executed would typically be in compiled form. Moreover the actual encryption/decryption and other DRM aspects are largely conventionally except as explained herein. Hence no further discussion is given of the encryption/decryption or other verification and security aspects. Instead the focus here is on the present rental aspect of the content as opposed to the conventional purchase/download approach.

First, there is provided here what is referred to as a "rental bag" that is part of the DRM for rentals. This entity is a set of data for each rental transaction, and includes the following: a rental identification (rentalid) which is a unique identifier assigned by the content rental database to each rental transaction; an account identifier which is an identifier for each user's iTunes account assigned by the iTunes Store; an identifier for the particular content item (program or movie) being rented; and other DRM specific data, including the conventional key bag. This rental bag is illustrated in FIG. 1 and its use explained further below.

Also provided are three rental related processes referred to here as deauthorization, check in and check out. Deauthorization occurs when a user who has rented a content item purchases a new computer or playback device and wishes to transfer the rented item to the new computer or device. Check in is associated with deauthorization. Briefly, a transfer involves checking in the rental item (to the content rental database) and then subsequently checking the same item out to the new (or another) device. Hence check in occurs when a user deauthorizes his old computer or device in favor of a new one, or when he transfers an asset (content item) from one device to another, such as from his computer to his iPod. A check in is followed by a check out, to the new or other device.

In more detail, check in involves the following actions, referring to FIG. 1. First, the iTunes client software (which is inherently resident in the iTunes client device 18) passes the rental bag, via the iTunes Store 12, to the content rental database and logic 26. The content rental database and logic 26 (hereinafter "rental database") checks whether the rental bag is eligible for check in. If not, an error indication is returned to the iTunes client. If eligible, the rental database sends the rental bag to the DRM server 24. The DRM server 24 processes the rental bag and extracts from it and returns to the content database 26 the rentalid, the date of the first playback of the content item, and the user account identifier. The rental database checks in the item then indicating the rental is terminated. In other words, it renders that content item (as still resident on the iTunes playback device 18 but in encrypted form) no longer playable. The rental database then sends the updated rental bag back to the iTunes client device 18.

The check out process occurs more frequently. Not only is it used as the second part of a transfer to complete the transfer, it is also invoked for each new rental (content item download.) Also, the check out process is invoked in the case when the client device 18 attempts to play a content item but does not have the requisite rental bag for decryption. For instance, this happens when the user attempts to play the item during the initial download. The check out process first requires the iTunes client device 26 to pass a rental bag (one received earlier by the client in a prior rental transaction) to the database 26. Also sent is the client device GUID 20. The database 26 sends this data on to the DRM server 24. The DRM server 24 processes the rental bag and returns to the database 26 the rentalid, the first playback time and date of the content item, and the user account identifier. The database 26 checks in response whether the rental bag is eligible for check out. If ineligible, and error message is returned to the iTunes client device 18. If eligible, the database 26 sends to the DRM server 24 the original rental bag and the new data associated with the current content item being check out. This data includes the rental id, key(s), rental expiration date (30 days) and rental duration date (24 hour period). The DRM server 24 in response formulates an updated rental bag with the data associated with the current content item being checked out, and send this updated rental bag to the database 26. The database 26 then associates the GUID (global universal identifier) and the rentalid of the updated rental bag in its database, thereby rendering that content item playable upon that device 18. The database 26 then sends the updated rental bag to the client device 18.

Provided in one embodiment is a security check procedure to attempt to defeat hackers, who try to use the system in unauthorized fashion, such as tampering with the content. This procedure is invoked for both check in and check out and does require initially detection by the system of tampering; this detection is part of the DRM process.

For check in, when the client first accesses the rental database, an element ("flag" in software terminology) is provided in the DRM data indicating the possible detected tampering. The content database then sends the rental bag to the DRM server with this indication. The DRM server then determines if there has been in fact tampering, and if so sends an indication (another flag) back to the content database. The content database maintains a flag counter for this type of flag for each item, and increments the counter upon receipt of each such flag. If the counter value exceeds a predetermined threshold, then that rentalid is excluded so that content item for that device is rendered unplayable. A warning or notice may be provided to the user at this point.

A similar security process is provided for the check out procedure. The check out here is modified so that when the content database checks whether the rental bag is eligible for check out, if it determines that the content item is already checked out to that GUID, then the transaction is excluded. Further, if the flag counter value for the rental is greater than the threshold, the transaction is excluded as above. If the value of the flag counter is below the threshold, the content is allowed to be played but the counter value is incremented. Again, a warning or notice may be provided to the user.

In accordance with another aspect, two embodiments are provided for respectively higher/lower levels of security. In the lower security embodiment, when the user elects to play the rented content, the relevant key bag for the entire rented item is downloaded to his client device and stored there. He can then play the content, even if thereinafter his client device is no longer in communication with the iTunes Store (e.g., the client device is no longer connected to the Internet). In the higher security embodiment, the keys are downloaded only as needed for each portion of the rented item, so the client device must remain in communication with the iTunes Store.

This disclosure is illustrative but not limiting. Further modifications will be apparent to those skilled in the art in light of this disclosure and are intended to fall within the scope of the appended claims.

We claim:

1. A non-transitory machine readable medium storing a program which when executed by at least one processing unit plays encrypted content on a client device, the program comprising sets of instructions for:
   in response to sending a request for a content, receiving the requested content in encrypted form from a server, the content received from the server over a first period of time;
   when input to play the encrypted content is not received during the first period of time, receiving a rental key for the encrypted content, the rental key valid for a second period of time; and
   upon receiving input to play the encrypted content during one of the first period of time and the second period of time:
      transmitting a request for a decryption key to the server; and
      receiving the decryption key so long as the request is within one of the first period of time and the second period of time.

2. The non-transitory machine readable medium of claim 1, wherein the content comprises video content.

3. The non-transitory machine readable medium of claim 1, wherein the decryption key is not received from the server if the input to play the encrypted content is received after the second period of time has expired.

4. The non-transitory machine readable medium of claim 1, wherein the decryption key is valid for a third period of time that is shorter than the second period of time.

5. The non-transitory machine readable medium of claim 4, wherein when the second period of time expires while the third period of time has not yet expired, playback of the content is enabled so long as the playback is not stopped or paused.

6. The non-transitory machine readable medium of claim 1, wherein the rental key is not received when the input to play the encrypted content is received during the first period of time.

7. The non-transitory machine readable medium of claim 1, wherein the decryption key is received in a key bag.

8. An electronic device comprising:
   a set of processing units: and
   a non-transitory machine readable medium storing a program which when executed by at least one of the processing units plays encrypted content on the electronic device, the program comprising sets of instructions for:
      in response to sending a request for a content, receiving the requested content in encrypted form from a server, the content received from the server over a first period of time;
      when input to play the encrypted content is not received during the first period of time, receiving a rental key for the encrypted content, the rental key valid for a second period of time; and
      upon receiving input to play the encrypted content during one of the first period of time and the second period of time:
         transmitting a request for a decryption key to the server; and
         receiving the decryption key so long as the request is within one of the first period of time and the second period of time.

9. The electronic device of claim 8, wherein the content comprises video content.

10. The electronic device of claim 8, wherein the decryption key is not received from the server if the input to play the encrypted content is received after the second period of time has expired.

11. The electronic device of claim 8, wherein the decryption key is valid for a third period of time that is shorter than the second period of time.

12. The electronic device of claim 11, wherein when the second period of time expires while the third period of time has not yet expired, playback of the content is enabled so long as the playback is not stopped or paused.

13. The electronic device of claim 8, wherein the rental key is not received when the input to play the encrypted content is received during the first period of time.

14. The electronic device of claim 8, wherein the decryption key is received in a key bag.

15. A method for playing encrypted content on a client device, the method comprising:
   in response to sending a request for a content, receiving the requested content in encrypted form from a server, the content received from the server over a first period of time;
   when input to play the encrypted content is not received during the first period of time, receiving a rental key for the encrypted content, the rental key valid for a second period of time; and
   upon receiving input to play the encrypted content during one of the first period of time and the second period of time:
      transmitting a request for a decryption key to the server; and
      receiving the decryption key so long as the request is within one of the first period of time and the second period of time.

16. The method of claim 15, wherein the content comprises video content.

17. The method of claim 15, wherein the decryption key is not received from the server if the input to play the encrypted content is received after the second period of time has expired.

18. The method of claim 15, wherein the decryption key is valid for a third period of time that is shorter than the second period of time.

19. The method of claim 18, wherein when the second period of time expires while the third period of time has not yet expired, playback of the content is enabled so long as the playback is not stopped or paused.

20. The method of claim 15, wherein the rental key is not received when the input to play the encrypted content is received during the first period of time.

* * * * *